(12) United States Patent
Dancer et al.

(10) Patent No.: US 6,629,260 B1
(45) Date of Patent: Sep. 30, 2003

(54) AUTOMATIC RECONNECTION OF PARTNER SOFTWARE PROCESSES IN A FAULT-TOLERANT COMPUTER SYSTEM

(75) Inventors: Colin Michael Dancer, Enfield (GB); Adam Paul Shepherd, Enfield (GB)

(73) Assignee: Data Connection Ltd, Enfield (GB)

( * ) Notice: Subject to any disclaimer, the term of this patent is extended or adjusted under 35 U.S.C. 154(b) by 564 days.

(21) Appl. No.: 09/645,535

(22) Filed: Aug. 25, 2000

(51) Int. Cl.[7] ............................................... G06F 11/00
(52) U.S. Cl. ................... 714/3; 714/38; 714/48
(58) Field of Search ................ 714/3, 15, 38, 714/48, 13

(56) References Cited

U.S. PATENT DOCUMENTS

| | | | |
|---|---|---|---|
| 5,129,080 A | 7/1992 | Smith | 395/575 |
| 5,271,013 A | 12/1993 | Gleeson | 371/9.1 |
| 5,363,503 A | 11/1994 | Gleeson | 395/575 |
| 5,528,750 A * | 6/1996 | Lubart et al. | 714/15 |
| 5,560,033 A | 9/1996 | Doherty et al. | 395/800 |
| 5,613,079 A * | 3/1997 | Debique et al. | 711/141 |
| 5,668,943 A * | 9/1997 | Attanasio et al. | 714/7 |
| 5,748,882 A | 5/1998 | Huang | 395/184.01 |
| 5,802,265 A | 9/1998 | Bressoud et al. | 395/182.09 |
| 6,067,640 A * | 5/2000 | Akiyama et al. | 714/38 |
| 6,195,760 B1 * | 2/2001 | Chung et al. | 714/4 |
| 6,477,663 B1 * | 11/2002 | Laranjeira et al. | 714/11 |

OTHER PUBLICATIONS

Hardware and Software Architectures for Fault Tolerance, Chapter 3 ed. Banatre et al, Springer–Verlag 1994.
Fault Tolerance in Distributed Systems, Chapter 5 Jalote, Prentice Hall 1994.
Fault Tolerant Computer System Design, Chapter 7 Predhan, Prentice Hall 1996.

* cited by examiner

Primary Examiner—Robert Beausoliel
Assistant Examiner—Bryce P. Bonzo

(57) ABSTRACT

In a fault-tolerant system employing software fault-tolerance techniques, automatic reconnection of partner processes after a failure of one or more of the partner processes requires that the partner processes are aware of the redundancy strategy employed by their partners. The present invention insulates the partner processes from the need for this knowledge, and also enables automatic reconnection between partner processes running in different parts of a heterogeneous distributed system.

26 Claims, 1 Drawing Sheet

Components required to support a join between processes A and B, each with a primary and backup copies executing on a separate CPU

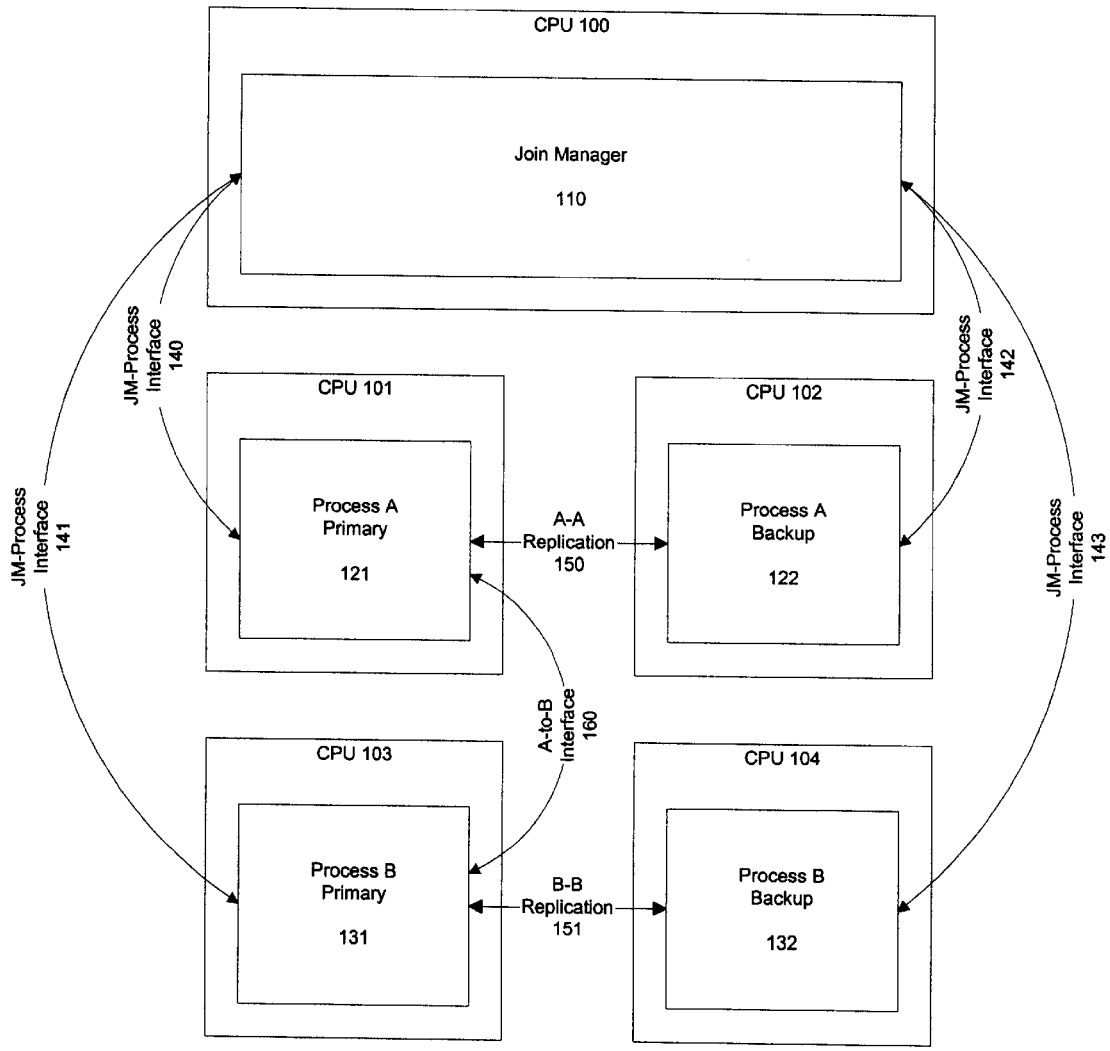
FIG. 1 Components required to support a join between processes A and B, each with a primary and backup copies executing on a separate CPU

AUTOMATIC RECONNECTION OF PARTNER SOFTWARE PROCESSES IN A FAULT-TOLERANT COMPUTER SYSTEM

BACKGROUND OF THE INVENTION

1. Field of the Invention

The present invention relates to the field of fault-tolerant computer systems. More specifically, the present invention relates to the problem reconnecting partner software processes that share an interface when any of these software processes may independently fail over to a redundant backup copy of the software process. The present invention solves this problem in a manner that is independent of the capabilities of the hardware and operating system used and ensures that the partner software processes do not have to be aware of the redundancy scheme used by their partners.

2. Description of Prior Art

Fault-tolerant computer systems use a variety of techniques to provide highly-available systems for use in safety-critical or mission-critical environments. Many different approaches have been taken by different organizations to achieve fault-tolerance.

One approach to fault-tolerance is to use specialized hardware and operating systems to mirror all inputs to a number of redundant processing units. Outputs from the system are taken from just one processing unit, called the primary, until it is determined to have failed and another processing unit is selected as the primary. Another approach is to take a majority vote for the correct output, and disabling any processing unit which disagrees with this output on the assumption that it has failed. For further details of this approach to fault-tolerance, see the following U.S. Pat. Nos. 5,271,013, Gleeson; 5,363,503, Gleeson; 5,560,033, Doherty et al.; and 5,802,265, Bressoud et al.

An alternative approach is to provide fault-tolerance in the software process layer, which avoids the need for specialized hardware or operating system support. This approach is also more easily deployed on a cluster of heterogeneous processing units with different hardware characteristics, since it does not rely on specific attributes of the hardware. Software fault-tolerance, as this approach is commonly called, typically uses a combination of redundant backup software processes and replication of internal state between the primary and backup copies of each software process to speed recovery from any software or hardware faults. However, many practical fault-tolerant systems combine both hardware and software fault tolerance techniques. For further details of the general techniques used to achieve software fault-tolerance, see the following U.S. Pat. Nos. 5,129,080, Smith; and 5,748,882, Huang. See also the following publications: *Hardware and Software Architectures for Fault Tolerance*, Chapter 3, ed. Banatre et al., Springer-Verlag 1994; *Fault Tolerance in Distributed Systems*, Chapter 5, Jalote, Prentice Hall 1994; and *Fault-Tolerant Computer System Design*, Chapter 7, Pradhan, Prentice Hall 1996.

A common problem in software fault tolerance is the need to reconnect partner software processes quickly and efficiently after one or more of the partners has failed over to a redundant backup copy. In many systems, this is achieved by using special hardware or operating system facilities to allow such reconnection. However such mechanisms are difficult to implement in heterogeneous distributed systems.

BRIEF SUMMARY OF THE INVENTION

The present invention, known as a "join", is a means of connecting two partner processes and automatically reconnecting them after one or both of the partner processes fails over to a redundant backup copy. This is achieved by use of a join manager component that allows the partner processes to register the joins between them and manages the reconnection after a fail over.

The present invention has the following advantages over prior art:

The present invention is independent of the system hardware architecture or operating system, and can be used in heterogeneous distributed systems.

The partner processes associated with a join do not need to know whether the other processes associated with a join employ a redundancy scheme or what that redundancy scheme may be, yet can be reconnected successfully even if the more than one partner to a join fails simultaneously.

The join manager actively controls reconnection, so no polling mechanism is required in the partner processes to achieve the reconnection. This saves on processor and communications resources by avoiding repeated unsuccessful attempts to poll a failed partner to see if it has recovered.

BRIEF DESCRIPTION OF THE DRAWINGS

FIG. 1 shows the use of replicated handles on an interface between two software processes, each with a primary and backup copy running on separate processing units.

REFERENCE NUMERALS IN THE DRAWINGS

System Components

- 100: A processing unit or CPU within a distributed computing system.
- 101: A processing unit or CPU within a distributed computing system.
- 102: A processing unit or CPU within a distributed computing system.
- 103: A processing unit or CPU within a distributed computing system.
- 104: A processing unit or CPU within a distributed computing system.
- 110: The join manager software process running on CPU 100.
- 121: The copy of Process A running on CPU 101. This copy is currently the primary copy of A.
- 122: The copy of Process A running on CPU 102. This copy is currently the backup copy of A.
- 131: The copy of Process B running on CPU 103. This copy is currently the primary copy of B.
- 132: The copy of Process B running on CPU 104. This copy is currently the backup copy of B.

Message Flows

- 140: Interface between join manager and 121 for creation, reconnection and release of joins.
- 141: Interface between join manager and 131 for creation, reconnection and release of joins.
- 142: Interface between join manager and 122 for creation, reconnection and release of joins.
- 143: Interface between join manager and 132 for creation, reconnection and release of joins.
- 150: Replication of internal state information between primary and backup copies of process A.

151: Replication of internal state information between primary and backup copies of process B.

160: The interface between processes A and B.

DETAILED DESCRIPTION OF THE INVENTION

This description covers a method for automatically reconnecting partner software processes after one or both of the partner processes fails over to a redundant backup copy. In the description, there are set forth, for purposes of explanation, many specific details, to provide the reader with a thorough understanding of the invention. It will be obvious to one skilled in the art that the invention may be practiced without these details. Furthermore, certain devices and orders of processing are given in the diagrams and the description, to make understanding the invention easier. It will, again, be apparent to one skilled in the art that the specific devices and sequences are merely illustrative and may be varied whilst remaining within the spirit and scope of the present invention.

Description of the Preferred Embodiment

What follows is a description of the preferred embodiment of the present invention. Other possible embodiments will be discussed later.

Components of a System that Supports Joins

With reference to FIG. 1, the preferred embodiment of a system that supports joins comprises the following components:

- A plurality of processing units, shown as CPU 100 through CPU 104, each of which may execute one or a plurality of software processes. FIG. 1 shows each software processes executing on a separate processing unit. Alternative embodiments of the present invention may have more than one software process executing on each processing unit.
- A join manager software process, 110, that executes on CPU 100. This process is responsible for controlling creation, reconnection and release of joins in response to requests from the partner processes.
- Two partner processes, process A and process B, each of which employs primary and backup redundancy. Process A Primary, 121, executes on CPU 101. Process A Backup, 122, executes on CPU 102. Process B Primary, 131, executes on CPU 103. Process B Backup, 132, executes on CPU 104.
- The join manager and partner processes communicate via a synchronous message passing interfaces, which require the sender of a message to know only the process identifier for the intended recipient in order to be able to send a message to that recipient. In the preferred embodiment of the present invention, join manager is responsible for creating the copies of each partner process in the system and is therefore able to learn the process identifier for each partner process copy such as 121, 122, 131 and 132.
- Join manager communicates with each of the partner processes to control the primary and backup status of each partner process copy and the joins between partner processes. This is shown as JM-Process Interface 140 through JM-Process Interface 143.
- Process A Primary replicates state information to Process A Backup via the A—A replication interface, 150.
- Process B primary replicates state information to Process B Backup via the B—B replication interface, 151.
- Process A and Process B primary copies communicate via A–B interface 160.

Creation of Joins

With reference to FIG. 1, the join between Process A and Process B is created as follows.

For each join, such as that between Process A and Process B corresponding to 160, one partner process registers the need for the join with the join manager. This partner to the join is known as the master side of the join. In FIG. 1 Process A is the master, so Process A primary, 121, requests, via 140, that join manager create the join. Join manager accepts the join request and informs 121 that it will be notified when the partner process is available.

Using information passed on the join request, join manager identifies the partner process for the join to be Process B, and sends a message, via 141, to Process B Primary, 131, requesting it to accept the join. The identifier passed on the join request is a combination of the name of the software process that Process A Primary, 121, wishes to join to plus an instance identifier that specifies, for example, the physical port which an instance of a communications protocol is associated with. Each process registers its name and instance identifier with join manager on startup.

Process B Primary, 131, replies to join manager, via 141, saying whether it can accept the join. If 131 accepts the join, join manager informs Process A primary, 121, via 140 that the partner process is now available and is 131.

The join manager may identify the partner process for the join by means of static or dynamic configuration information, or by means of a logical identifier registered by Process B Primary, 131, via 141 when 131 initializes and passed from Process A Primary, 121, via 140 when 121 requests the creation of the join.

Reconnection after single process failure

With reference to FIG. 1, consider the case when 121 fails. Join manager is able to automatically reconnect the join between Process A and Process B as follows.

Join manager detects the failure of processes 121. In the preferred embodiment, join manager uses operating system services to request notification from the operating system of the failure of any process that system manger controls.

Join manager notifies 131, via 141, that the partner process for the join has failed and that it will be notified when a new partner process is available.

Join manager notifies 122, via 142, that it should become the Process A Primary.

While 122 activates as the new Process A Primary, it detects from the replicated state or configuration information that it needs the join with Process B and requests, via 142, that join manager reconnect the join. Join manager informs 122, via 142, that it will be notified when the partner process is available.

Join manager identifies the partner process for that join is 131 and sends a message via 141 to Process B Primary, 131, requesting it to accept reconnection of the join to 122. Process B Primary, 131, replies to join manager, via 141, saying whether it can accept the reconnection. If 131 accepts the reconnected join, join manager informs the new Process A Primary, 122, via 142 that the partner process is now available and is 131.

When 122 has requested reconnection of all the joins it is aware of, it informs join manager, via 142, that activation of the new Process A Primary, 122, is complete. Join manager can then perform any garbage collection needed to release resources used by unwanted joins (see the section entitled "Release of Joins" below).

Reconnection after multiple process failures

With reference to FIG. 1, consider the case when both 121 and 131 fail simultaneously after the join between process A and Process B has been established. At this point, the software processes know the following information:

Join manager is aware of the process identifiers for both of the backup processes, 122 and 132, and the need to reconnect the join between process A and process B once a new primary has been restored to service.

Process A Backup, 122, is aware from the state information replicated via 150 that it should be joined to Process B, but it does not know the process identifier of 132. If 122 was aware of the process identifier for 132, this would imply that the partner processes are aware of the redundancy strategy employed by its partner processes, which complicates the implementation of each process and increases the volume of data it must maintain about each partner process. The present invention avoids this by use of the join manager, as described below.

Similarly, Process A Backup, 132, is aware from the state information replicated via 151 that it should be joined to Process A, but it does not know the process identifier of 122.

Join manager is able to automatically reconnect the join between Process A and Process B without the need for either process to be aware of the redundancy strategy employed by its partner. With reference to FIG.1, join manager achieves reconnection of the join between Process A and Process B as follows.

Join manager detects the failure of processes 121 and 131.

Join manager notifies 122, via 142, that it should become the Process A Primary.

Similarly, join manager notifies 132, via 143, that it should become the Process B Primary.

While 122 is activating as the new Process A Primary, it detects from the replicated state information that it needs the join with Process B and requests, via 142, that the join manager reconnect the join. Join manager informs 122, via 142, that the partner has failed and it will be notified when the partner process is available.

132 completes activating as the new Process B primary and informs join manager, via 143, that it is ready.

Both sides of the join are now available, so join manager sends a message, via 143, to the new Process B Primary, 132, requesting i t to accept reconnection of the join to 122. 132, replies to join manager, via 143, saying whether it can accept the reconnection. If 132 accepts the reconnected join, join manager informs the new Process A Primary, 122, via 142 that the partner process is now available and is 132.

Release of Joins

Joins are released in the following circumstances

If the master side of a join requests that the join be destroyed, join manager informs the other partners to the join that the join has been destroyed then releases any resources it holds relating to the join.

If the master side of a join fails and does not request the join to be reconnected during activation of the backup process as the new primary process, join manager assumes that the join is not longer required and manager informs the other partners to the join that the join has been destroyed then releases any resources it holds relating to the join. This garbage collection prevents any faults or inconsistencies in the replication of state between primary and backup copies of the master side of the join consuming unwanted resources in join manager or partner processes.

Similarly, if the master side of a join fails with no active backup copy available to be activated as the primary, join manager garbage collects the join and informs the other partners to the join that the join has been destroyed.

Description of Alternative Embodiments

What follows is a description of some alternative embodiments of the present invention. One skilled in the art will easily be able to envisage other alternative embodiments of the invention.

It should be noted that the section titled "Detailed Description of the Invention" is simply a description of the preferred and some additional embodiments of the invention; the full scope of the invention is determined by the claims. A systems engineer skilled in the art of developing fault-tolerant distributed computing systems, based on the claims and the detailed description, should be able to implement a wide variety of systems for automatic reconnection of partner software processes significantly advanced compared with the current state of the art.

Distribution of System Components

The components of the preferred embodiment of the present invention can be instantiated in different forms according to the requirements and capabilities of the hardware and operating system. Some alternative embodiments include the following variations:

Software processes that use joins may communicate with the join manager or between partner processes by means of function calls or message exchanges. The communication method chosen for this interaction may be different for different partner processes.

All components of the system may be instantiated on a single processing unit or any subset of the processing units that make up a distributed system. In particular, each partner process may be instantiated on a different set of processing units, though said sets of processing units may overlap for different partner processes. All processing units may be of a single type, or each processing unit may be one of a plurality of different types.

Creation of Partner Processes

The preferred embodiment of the present invention enables join manager to learn of the existence and identity of each partner process copy in the system because join manager is responsible for starting each process copy. Some alternative embodiments may move this responsibility for partner process creation to one or a plurality of other components in the system. In such cases, join manager needs to be notified of, or be able to monitor for, new partner process copies created by any system component.

The means of creating a new copy of a process may be different for each partner process.

Failure of Partner Processes

The preferred embodiment of the present invention uses underlying operating system facilities to allow join manager to learn of the failure of any partner process copy in the system. Some alternative embodiments may achieve this by other means, such as requiring a watchdog message sent from each partner process copy to join manager via the JM-process interface on a timed basis, or monitoring the health of the processing unit on which a partner process copy is executing using specialized hardware support. In such cases, join manager needs to be notified of, or be able to monitor for, failure of partner process copies however this failure is detected.

The means of process copy failure detection may be different for each partner process or for each processing unit on which partner process copies are executing.

Control of Primary and Backup Process State

Some alternative embodiments of the present invention may move the decision point for control of the primary or backup status of each partner process copy from join manager to one or a plurality of other components in the system, such as the underlying operating system if it has suitable facilities. In such cases, join manager needs to be notified of, or be able to monitor for, changes to the state of each partner process copy.

The means of control of the primary and backup partner process copy state may be different for each partner process.

Redundancy Strategy for Partner Processes

The preferred embodiment of the present invention uses 1:1 redundancy for the partner processes with one primary and one backup copy of each process. Alternative embodiments may employ different redundancy strategies for the partner processes, including the following possible strategies:

- A partner process may use no redundancy and rely on a new copy being started after failure. This may be combined with separate persistent storage of the internal state of the partner process in order to enable the new copy to recover quickly to the point at which the previous copy of the process failed.
- A partner process may employ more than one backup copy to give improved failure protection.
- A group of n similar partner processes, such as the copies of a communications protocol stack running on each of a set of n line cards, may employ m (usually m<n) backup copies, each of which may be activated to replace any failed process from the group. This is known as m:n redundancy.

The redundancy strategy used may be different for each partner process

Fault Tolerance of Join manager

Some alternative embodiments of the present invention may make use of redundant copies of the join manager with replication of internal state between the join manager copies in order to make the management of joins resilient to join manager software process failure.

Real-time Awareness

Some alternative embodiments of the present invention may provide additional information to the partner processes to a join to enable the partner processes to determine whether a join is reconnected fast enough to satisfy the real-time requirements of the partner processes. This may be particularly important for the use of joins in communications protocols.

Some possible alternative embodiments that enable such determination include the following:

- The join manager can indicate on the notification to a partner process that the other side of a join has failed whether a backup copy of the partner process is in the process of being activated as the new primary. If no backup process is immediately available, the surviving partner process may choose to release resources associated with the join immediately.
- When notifying a partner process of the reconnection of a join, the join manager may specify the time when the failure of the join was detected, or it may specify the time interval since the failure was detected. The partner process can use this information to determine whether the join has been reconnected fast enough to meet its needs before replying to the join manager to indicate whether it accepts the reconnection. If the reconnection is not accepted, the partner processes and join manager must release any resources associated with the join.

Revocation of Service

Some alternative embodiments of the present invention may allow a software process to declare that it is unable to continue to provide service to partner processes, for example because it has received a configuration request that disables this function. The join manager treats such revocation of service as a temporary failure of the joins that this process participates in and notifies all partners to this process that the process in unavailable. When the software process declares that it is able to restore service, the join manager automatically reconnects the joins in the same way as it would if the primary copy of this software process had failed and a backup had been activated in its place, though the primary copy has not actually changed.

We claim:

1. A method for automatically reconnecting software processes that share an interface after one or more said software processes, known as partner processes, fails over to a redundant backup copy, said method comprising of
    a. first means for registering each copy of said partner processes with a join manager component when said copy of said partner processes finishes initializing
    b. second means for controlling the primary or backup status of each said copy of said partner processes that executes on one or a plurality of processing units in a computer system
    c. third means for said partner processes requesting that said join manager create or release an association between two or more said partner processes, said association being known as a join
    d. fourth means for detecting the failure of the primary or backup copy of said partner process associated with said join
    e. fifth means for notifying the remaining partner processes associated with said join of the failure of said primary copy of said partner process associated with said join
    f. sixth means for said join manager notifying said remaining partner processes when a replacement primary copy of said failed partner process is restored to service whereby said partner processes do not have to be aware of the redundancy or replication strategy used by other said partner processes associated with said join, which may be different for each said partner process associated with said join, and whereby said automatic reconnection of said partner processes is independent of the hardware or operating system support for such reconnection.

2. The method as set forth in claim 1, wherein said join manager is a software process and a copy of said join manager process executes on one or a plurality of said processing units with one said copy of said join manager process chosen to be the primary copy of said join manager process, said primary copy of said join manager process being responsible for all interaction between said join manager process and said partner processes and for replication of any state information required by the backup copies of said join manager process if said primary copy of said join manager process fails and a new primary copy is chosen from said backup copies of said join manager process.

3. The method as set forth in claim 1, wherein said first means is achieved by said join manager having responsibility for starting and stopping said copy of said partner processes.

4. The method as set forth in claim 1, wherein said first means is achieved by said copy of said partner process informing said join manager when it is initialized via use of a message-based or function call-based interface provided by said join manager.

5. The method as set forth in claim 1, wherein said second means is achieved by said join manager sending messages to a said copy of said partner process when said join manager requires said copy to change to primary or backup state.

6. The method as set forth in claim 1, wherein said third means is achieved by said partner processes communicating with said join manager of said joins via a message-based interface provided by said join manager.

7. The method as set forth in claim 1, wherein said third means is achieved by said partner processes communicating with said join manager of said joins via a function call-based interface provided by said join manager.

8. The method as set forth in claim 1, wherein said fourth means is achieved via use of facilities provided by the operating system to detect the failure of said primary or backup partner process copy.

9. The method as set forth in claim 1, wherein said fourth means is achieved by requiring said copies of said partner processes each to send a watchdog message to said join manager on a regular basis to confirm the continued correct operation of said copies of said partner processes.

10. The method as set forth in claim 1, wherein said fourth means is achieved by said join manager using seventh means to monitor for the failure of said processing units on which one or more of said partner processes are executing.

11. The method as set forth in claim 10, wherein said seventh means is achieved via use of facilities provided by the operating system to detect the failure of said processing units.

12. The method as set forth in claim 10, wherein said seventh means is achieved by requiring said operating system executing on each of said processing units to send a watchdog message to said join manager on a regular basis to confirm the continued correct operation of said processing units.

13. The method as set forth in claim 1, wherein said fifth means is achieved via use of a message-based interface provided by said join manager.

14. The method as set forth in claim 1, wherein said fifth means is achieved via use of a function call-based interface provided by said join manager.

15. The method as set forth in claim 1, wherein said fifth means further includes eighth means for said remaining partner processes to determine whether said primary copy of said failed partner process is likely to be restored to service fast enough for said remaining partner processes to consider said join to persist across the failure and recovery of said failed partner process, the timing requirements for said join to persist being determined independently by said remaining partner processes.

16. The method as set forth in claim 15, wherein said eighth means is achieved by said system manger identifying on said notification to said remaining partner processes whether a backup copy of said failed partner process is already registered with said join manager and will be instructed by said join manager to become said replacement primary copy of said failed partner process.

17. The method as set forth in claim 1, wherein said sixth means is achieved via use of a message-based interface provided by said join manager.

18. The method as set forth in claim 1, wherein said sixth means is achieved via use of a function call-based interface provided by said join manager.

19. The method as set forth in claim 1, wherein said sixth means further includes an ninth means for the remaining partner processes to determine whether said replacement primary copy of said failed partner process has been restored to service fast enough for said remaining partner processes to consider said join to persist across the failure and recovery of said failed partner process, the timing requirements for said join to persist being determined independently by said remaining said partner processes.

20. The method as set forth in claim 19, wherein said ninth means is achieved by said system manger identifying on said notification to the remaining said partner processes the time interval between the failure of the previous said primary copy of said failed partner process and the activation of said replacement primary copy thereof.

21. The method as set forth in claim 19, wherein said ninth means is achieved by said system manger identifying on said notification to the remaining said partner processes the time of the failure of the previous said primary copy of said failed partner process.

22. The method as set forth in claim 1, wherein said third means further includes tenth means for said join manager to identify the partner processes associated with said request to create or release said join.

23. The method set forth in claim 22, wherein said tenth means is achieved by means of static or dynamic configuration information available to said join manager.

24. The method set forth in claim 22, wherein said tenth means is achieved by said partner process specifying an identifier for each said partner process associated with said join, said identifier being registered with said join manager by said first means.

25. The method as set forth in claim 1, wherein said first means is achieved by said join manager using eleventh means to discover the capabilities of each said processing unit to run said partner processes and said join manager starting or stopping said partner processes on said processing units in accordance to the load presented to the system and the capabilities of said processing units.

26. The method as set forth in claim 25, wherein said eleventh means is achieved by said join manager using operating system facilities to discover when said processing units are added to or removed from the system and to learn the type of each said processing unit, said type being matched by said join manager against static or dynamic configuration information available to said join manager to determine the capability of said processing units to run said partner processes.

* * * * *